Aug. 20, 1968 N. H. EDSTRÖM 3,398,243

CIRCUIT ARRANGEMENT FOR SUPERVISING THE TERMINAL EQUIPMENT BELONGING TO A JUNCTION LINE EXTENDING BETWEEN TWO TELEPHONE EXCHANGES

Filed Aug. 27, 1965 2 Sheets-Sheet 1

INVENTOR.
NILS HERBERT EDSTRÖM
BY Hane and Nydick
ATTORNEYS

CIRCUIT ARRANGEMENT FOR SUPERVISING THE TERMINAL EQUIPMENT BELONGING TO A JUNCTION LINE EXTENDING BETWEEN TWO TELEPHONE EXCHANGES

Filed Aug. 27, 1965 2 Sheets-Sheet 2

INVENTOR.
NILS HERBERT EDSTRÖM
BY Hane and Nydick
ATTORNEYS

United States Patent Office 3,398,243
Patented Aug. 20, 1968

3,398,243
CIRCUIT ARRANGEMENT FOR SUPERVISING THE TERMINAL EQUIPMENT BELONGING TO A JUNCTION LINE EXTENDING BETWEEN TWO TELEPHONE EXCHANGES

Nils Herbert Edström, Vallingby, Sweden, assignor to Telefonaktiebolaget L M Ericsson, Stockholm, Sweden, a corporation of Sweden Filed Aug. 27, 1965, Ser. No. 483,258
Claims priority, application Sweden, Sept. 23, 1964, 11,402/64
7 Claims. (Cl. 179—18)

ABSTRACT OF THE DISCLOSURE

There is disclosed a circuit arrangement for supervising the function of a two-wire junction line connecting two telephone exchanges. The junction line connects an outgoing terminal to an incoming terminal. At one of the terminals a threshold means has a low resistance as long as it receives a current greater than a given value and has a high resistance when it receives a current less than a given value for giving an indication as long as it has a low resistance, and is connected between the two wires. A memory means at the other terminal has a low resistance when it receives a current greater than a given value and it retains the low resistance in accordance with the rate of decay of current applied thereto for giving an indication when having its low resistance. The circuit arrangement further comprises a source of electrical energy and means for connecting the source and the memory means in series between the two wires. A control means serves to apply current sources with predetermined rates of decay to the memory means for controlling the resistance thereof.

Figure 1:
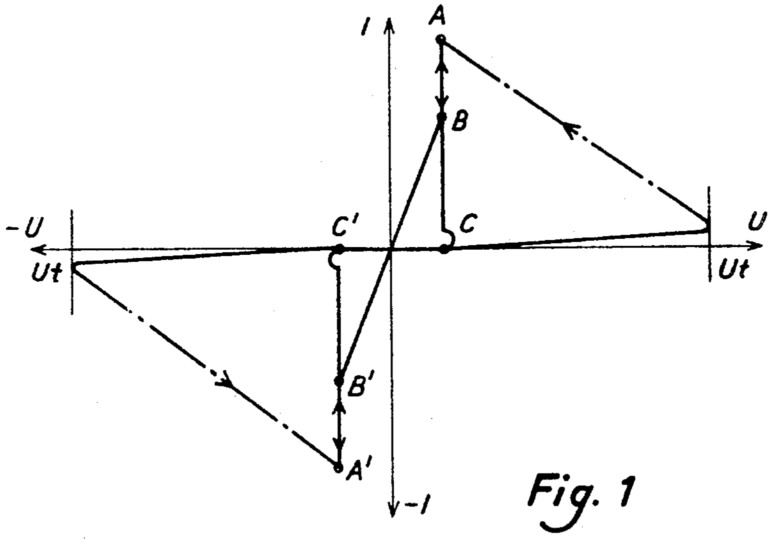

The present invention refers to a circuit arrangement for supervising the incoming and the outgoing terminal equipment belonging to a two-wire junction line between two telephone exchanges.

As is known a two-wire junction line between two telephone exchanes is provided with terminal equipments or junction line relay sets the purpose of which is to supervise the connection and to replace a third conductor whose condition would be different depending on whether a call, a testing, seizing, connection or disconnection is going on. Between the terminal equipments is thus provided a two-wire line *a, b* which connects the two exchanges with each other while the junction line relay sets have in the direction to their own exchange 3 wires; the *a*-, *b*- and *c*-wires. The junction line relay sets are rather bulky and they have furthermore the drawback that it is difficult to prevent an erroneous disconnection of line sections during a connection. It may also happen that sections are disconnected on both sides of a middle section. This middle section is left in a connected connection which obviously is injurious for the traffic. In conventional junction line relay sets, there can furthermore arise an erroneous function due to the fact that in relays which are not used sufficiently often as is the case with the junction line relay sets, the contacts become dirty so that faults arise in the contacts which connect the line to the two ends of the junction line relay set.

The invention has for an object the elimination of such inconveniences. A further object is to provide a junction line relay set that is simpler and cheaper and more reliable in service than the earlier known arrangements.

The circuit arrangement according to the invention comprises, at one end of a two-way line, an outgoing terminal equipment which includes a solid state current controlling element ("Festkörperschalter") which has a threshold function. The element after having exceeded an ignition or activation voltage may be held in a conducting state by means of a current through the element, provided that said current does not decrease below a certain minimum value. This element is connected via a sensing relay between the two wires of the line. Connected to the other end of the line is an incoming terminal equipment which comprises two connecting elements ("solid state semiconductor element," "Festkörperschalter") with memory properties. These two elements may be transferred from a high resistance condition into a low resistance condition by means of a current pulse with a slowly decreasing time curve, and from a low resistance condition may be transferred into high resistance condition by means of a current pulse with a rapidly decreaseing time curve. One of these two elements is connected between one of the wires of the line and one of the poles of a voltage source and the second is connected between the other of the wires of the line and the other pole of the voltage source through a second sensing relay. A test circuit is so formed which contains the sensing relays of both terminal equipments, whereby all connecting elements in the idle condition of the junction line are in their low resistance state. The incoming terminal equipment further comprises sources for current pulses with steep rear flanks for transferring its two elements into the high resistance condition when the connection has been established, in order to interrupt thereby the test circuit, and furthermore sources for current pulses with slowly decreasing sloping rear flanks for bringing the elements to the low resistance condition after the end of the call so as to restore thereby the test circuit.

Figure 2:
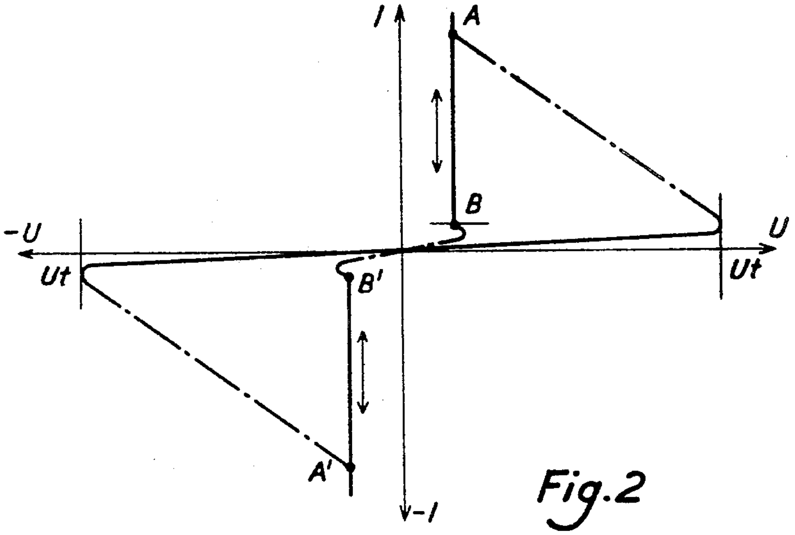
Figure 3:
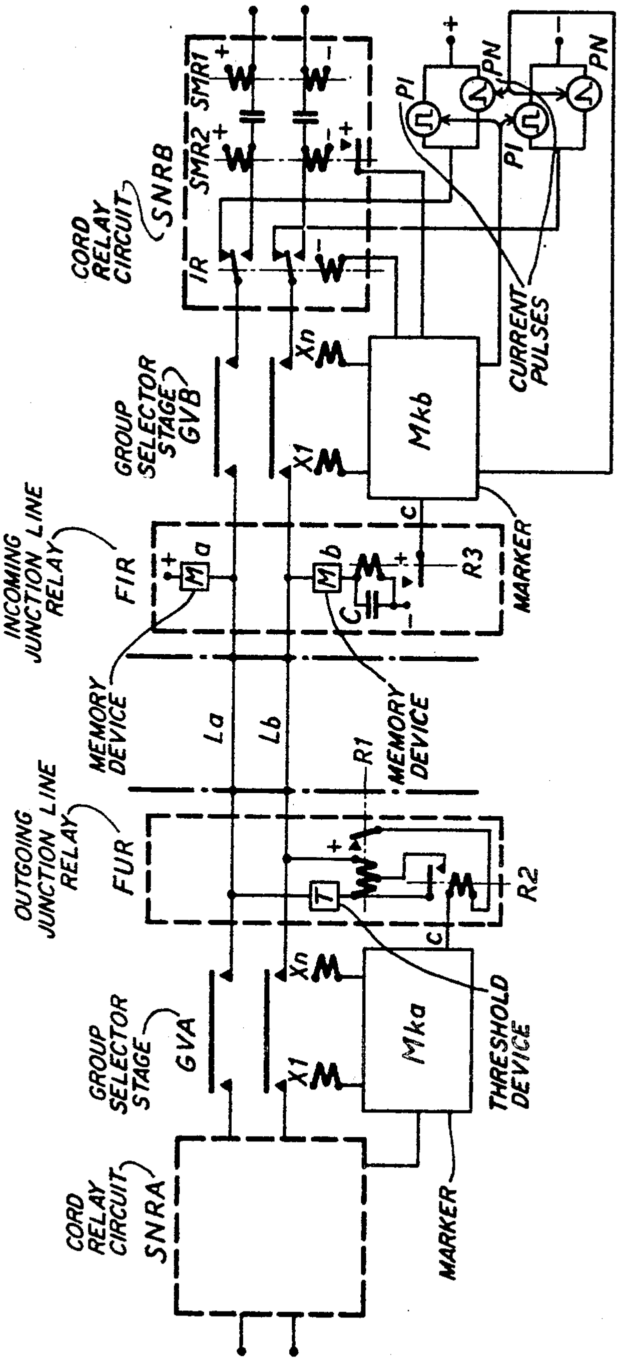

The invention will be explained more closely herebelow by means of an embodiment described with reference to the drawing in which FIG. 1 shows a voltage-current characteristic curve of a solid state semi-conductor element with memory properties, herebelow called a memory element, FIG. 2 is a voltage current characteristic of a solid state semi-conductor element with a threshold function, herebelow called a threshold element, and FIG. 3 shows a simplified circuit diagram of the circuit arrangement according to the invention.

The semi-conductor elements are normally in a high resistance state because the semi-conductor material is in an amorphous condition. If a current passes through the semi-conducting, amorphous layer causing sufficiently high current density, the layer becomes conducting. The change from the insulating to the conducting state occurs when an activating voltage of for example 60–70 v. is exceeded. This voltage depends upon the chemical composition of the material. In dependence on the chemical composition of the elements two different types may be distinguished. In one type, the voltage current characteristic curve of which is shown in FIG. 1, the conducting state may be maintained after the current has ceased or has changed direction. The element will have a normal resistance characteristic provided the current has decreased slowly to zero value. Upon a rapid decrease of the current to zero value the element is again transferred into the high resistance state as is shown in FIG. 1. This element is hereinafter called memory element.

FIG. 2 shows a voltage current characteristic curve of an element of the other type in which the conducting state exists, after the element has been exposed to the threshold voltage, only until the current decreases below a certain lower limit. If the current value has decreased below this lower limit the low resistance state ceases and the element returns to its high resistance state. This element contrary to the first mentioned element, cannot maintain its low resistance state even if the current should decrease slowly. This element is hereinafter called the threshold element.

FIG. 3 shows a simplified circuit diagram for the circuit arrangement according to the invention where only those parts are shown which are necessary for the understanding of the idea of the invention. A calling subscriber is connected to an outgoing junction line La, Lb through a, not shown, selector stage, a cord circuit relay set SNRA, a group selector stage GVA and an outgoing junction line relay set FUR in known manner. In the called exchange the connection is extending in a corresponding manner from an incoming junction line relay set FIR through a group selector stage GVB, a cord circuit relay set SNRB and a, not shown, selector stage to the called subscriber. The establishment of the connection from the cord circuit relay set SNRA to the outgoing terminal equipment FUR is carried out by means of a marker MK*a* and from the incoming junction line relay set FIR to the cord circuit relay set SNRB by means of a marker MK*b* by the selection of free junction lines in a known manner.

According to the invention, the outgoing junction line relay set FUR contains a semi-conductor element T with threshold function which is connected between the two lines L*a*, L*b* through a sensing relay R1. The incoming junction line relay set FIR includes a semi-conductor element M*a* connected between the positive pole of a direct current source and the conductor L*a* while a second memory element M*b* is connected between the other line wire L*b* and the negative pole of the same voltage source through a sensing relay R3.

The circuit arrangement functions in the following manner: it is assumed that, initially, both the memory elements M*a*, M*b* and the threshold element T are in their low resistance states. At that time, a current passes from the positive pole of the voltage source through the element M*a*, the line L*a*, the element T, the winding of the relay R1, the line L*b*, the element M*b* and the winding of the relay R3 to the negative pole of the voltage source. Due to this current the relay R1 operates and it will be maintained operated. The fact that the relay R1 has been operated indicates that the line L*a*, L*b* is faultless and the current flows through the line. If the line L*a*, L*b* should be short-circuited or disconnected or if element M*a* or M*b* should change to the high resistance condition or, if the voltage applied to the line through these elements should disappear, the relay R1 will release and will interrupt the positive potential that normally is supplied to the marker through a relay R2 through the break contact of the relay R1. Through the relay R3 the same current is passing as through R1 but the relay R3 is so dimensioned that it does not operate.

When the line from the calling exchange is seized, the *c*-wire from the outgoing junction line relay set FUR will be tested. If the potential of the *c*-wire is positive, this implies that the connection between the exchanges is faultless because a positive potential has been obtained from the contact of the sensing relay R1. The winding of the relay R2 constitutes a test resistance with which the test circuits in the marker M*a* can co-operate. Upon a test that indicates that the line is idle and accessible, a negative potential will then be connected to the *c*-wire from the marker causing operation of the relay R2. In consequence of this, a portion of the winding of the relay R1 will be short-circuited so that the current strength through the loop L*a*, L*b* and consequently also through the relay R3, increases. Thus the relay R3 operates and the relay R1 is still maintained operated as a part of its winding is still traversed by current. Thus, upon a call through the line, relay R1 is still maintained energized and as a consequence of the fact that relay R2 has operated, now also R3 is operated. When relay R3 has operated this is interpreted by the marker MK*b* in the called exchange, as a call having been made. The marker thus connects the incoming junction line relay set FIR to a free cord circuit SNRB. The called exchange comprises sources PI for current pulses with steep rear flanks and sources PN for producing current pulses with sloping rear flanks. As it appears from the description hereabove the first mentioned pulses can transfer the elements from the low resistance condition into the high resistance condition and the last mentioned ones can transfer the elements from the high resistance condition into the low resistance condition.

The purpose of the marker is to connect to the talking wires the corresponding current pulse source in dependence on whether the memory elements should be brought to the low resistance condition or to the high resistance condition. When the marker MK*b* has selected a free cord circuit relay set SNRB and has connected it to the line L*a*, L*b* through the group selector stage GVB, the marker connects to the talking wires a current pulse with a steep rear flank through the cord circuit relay set SNRB. Then the memory elements M*a*, M*b* are brought to the high resistance condition so that the current of the loop L*a*, L*b* ceases and the threshold element T becomes a high resistance. Thus, the relay R1 releases. Consequently, the voltage to the relay R2 is interrupted through the break contact of the relay R1. The fact that this potential disappears, immediately after the busying, is an indication for the marker MK*a* in the originating exchange that the line is busy. After this the marker in the originating exchange connects the outgoing cord circuit relay set SNRA to the line L*a*, L*b* through the outgoing selector stage GVA of the originating exchange. In this way the junction line relay set FUR has carried out its function, the relays R1 and R2 are both released and the threshold element T is in a high resistance state. As the loop between the poles of the direct current source and through the line L*a*, L*b* has switched to a high resistance state, the relay R3 can no longer operate and releases. The marker MK*b* in the called exchange interprets this as an indication that the extinguishing of the elements M*a*, M*b* has been carried out. The selectors of the originating exchange and of the called exchange will thus be connected to a line which is fully separated from the test circuit that has passed through the elements M*a*, T and M*b*. The marker MK*b* actuates a switching relay IR, by the operation of which the line is connected to a current feed relay SMR2 so that a speech connection now is established.

At the termination of the call, the loop will be interrupted and then the current feed relay SMR2 in the cord circuit relay set SNRB of the called exchange releases. In consequence of this, the positive potential is disconnected from the test contact of the marker MK*b* so that the switching relay IR releases. Thus the source PN of the current pulses with sloping rear flanks is connected to the lines L*a*, L*b*, so that the memory elements M*a*, M*b* are again brought to the low resistance condition. Simultaneously, also, the threshold element T in the originating exchange becomes conducting and is held in a conducting state by the current passing again between the poles of the direct current source through the element M*a*, the line L*a*, the element T, the relay winding R1, the line L*b*, the memory element M*b* and the relay winding R3. Due to this, the relay R1 operates and connects through its contact an idle-marking positive potential to the marker MK*a*. In the meantime, the cord circuit relay set SNRA in the originating exchange and its connection with the junction line relay set FUR have already been disconnected, so that the line L*a*, L*b* is free at both ends. Thus again the initial position is found in which the memory elements M*a* and M*b* and the threshold element T are in their low resistance states and the connection is ready for the next setting up. The capacitor C, connected in parallel with the winding of the relay R3, has the purpose to allow the passing of the current pulse when this is connected to the line, otherwise the current could not reach the necessary minimum value owing to the relay winding R3.

By means of the described circuit arrangement it is thus achieved that the connection will be marked busy as soon as an interruption or a short-circuiting occurs through the line and furthermore that a forced release of the connection is carried out after the termination of the call when the connecting elements are transferred into their low resistance conditions due to the fact that the current paths through the relays do not pass through any contacts. The reason why, in the originating exchange, a threshold element is used while, in the called exchange, a memory element is used is that after the repairing of a line fault causing the extinguishing of the threshold element in the originating exchange (with accompanying warning) when relay R1 has released without the occurrence of a call, this will again be ignited after the repairing of the fault, as the memory elements of the called exchange are still in their low resistance state.

I claim:

1. A circuit arrangement for supervising the function of a two-wire junction line connecting two telephone exchanges, said line having at one end an incoming terminal equipment and on the other end an outgoing terminal equipment, said outgoing terminal equipment comprising a solid state current controlling threshold element having threshold properties such that said element, after having been connected to a voltage exceeding an ignition voltage value, may be transferred from a high resistance condition to a low resistance condition and maintained in said latter condition by means of a current held above a definite limit, a first sensing relay being connected between the two wires of the line in series with said solid state current controlling threshold element, and said incoming terminal equipment comprising two solid state current controlling memory elements having memory properties such that said elements may be transferred from a high resistance condition into a low resistance condition by means of a current pulse with a sloping near flank and from a low resistance condition may be transferred into a high resistance condition by means of a current pulse with a steep rear flank, said circuit arrangement comprising a voltage source having two poles, means for connecting one of said memory elements between one of the line wires and one pole of said voltage source, a second sensing relay, and means for connecting in series the other memory element and said second sensing relay between the other line wire and the other pole of said voltage source, said sensing relays and said solid state current controlling elements being included, in series, in a test loop extending between the two poles of said voltage source through the line, said incoming terminal equipment further comprising sources for supplying current pulses with steep rear flanks to both wires of the line for transferring said solid state current controlling elements into a high resistance condition interrupting thereby the test loop when a telephone conneciton has been established, and furthermore, sources for supplying current pulses with sloping rear flanks to both wires of the line so as to bring said solid state current controlling elements to low resistance condition restoring thereby the test loop after the termination of a conversation.

2. A circuit for supervising the function of a junction line between two telephone exchanges, said junction line having two wires connecting an outgoing terminal to an incoming terminal, said circuit comprising, at one of said terminals, a threshold means that has a low resistance as long as it receives a current greater than a given value and has a high resistance when it receives a current less than said given value for giving an indication as long as it has a low resistance, means for connecting said threshold conducting means between said two wires, and, at the other of said terminals, a memory means that has a low resistance when it receives a current greater than a given value and retains the low resistance in accordance with the rate of decay of current applied thereto for giving an indication when having a low resistance, a source of electrical energy, means for connecting said source of electrical energy and said memory means in series between said two wires, and control means for applying current pulses with predetermined rates of decay to said memory means for controlling the resistance thereof.

3. The circuit of claim 2 wherein said threshold means includes a threshold element which has a low resistance as long as it receives a current greater than a given value and a high resistance at all other times, and a current sensing relay which is operative only for a given minimum current, and means for connecting said threshold element and said current sensing relay in series.

4. The circuit of claim 3 wherein said threshold element is a solid state current controlling element.

5. The circuit of claim 2 wherein said source of electrical energy has first and second poles and wherein said memory means comprises first and second current controlling elements which have a low resistance when receiving current greater than a given value and which retain the low resistance in accordance with the rate of decay of current applied thereto and a current sensing relay and further comprising means for connecting the first current controlling element between one pole of said source of electrical energy and one of said wires, means for connecting the second current controlling element and the current sensing relay in series between the other pole of said source of electrical energy and the other of said wires, and means for connecting said control means to the first and second current controlling elements.

6. The circuit of claim 5 wherein said first and second current control elements are solid state current controlling elements.

7. The circuit of claim 5 wherein said control means includes a first current pulse generator for generating pulses having steep trailing flanks and a second current pulse generator for generating pulses having gradually sloping trailing flanks, and means for selectively energizing said first and second pulse generators.

References Cited

UNITED STATES PATENTS

| | | | |
|---|---|---|---|
| 2,962,556 | 11/1960 | Hjertstrand | 179—18 |
| 3,086,083 | 4/1963 | Feder | 307—258 |
| 3,271,591 | 9/1966 | Ovshinsky | 307—258 |

KATHLEEN H. CLAFFY, *Primary Examiner.*

LAURENCE A. WRIGHT, *Assistant Examiner.*